0.1 μ

0.1 μ

0.1 μ

United States Patent Office

3,499,779
Patented Mar. 10, 1970

3,499,779
TITANIUM DIOXIDE PIGMENT
Robert K. Mays, Havre de Grace, and Philip Thomas Cioni, Bel Air, Md., assignors to J. M. Huber Corporation, Locust, N.J., a corporation of New Jersey
Filed Jan. 26, 1967, Ser. No. 612,035
Int. Cl. C09c 1/28, 1/36
U.S. Cl. 106—300          2 Claims

ABSTRACT OF THE DISCLOSURE

The disclosure sets forth a pigment consisting of an amorphous sodium silico aluminate titanium dioxide complex. A disclosed method for obtaining the complex consists of using the thermal hydrolysis or sulfate process of producing titanium dioxide and hydrolyzing the titanyl sulfate in blunge water containing sodium silico aluminate.

BACKGROUND OF THE INVENTION

The field of the invention is in prime white pigments which are used in commercial materials such as paper, paint, rubber, plastics, sealants, and the like. Titanium dioxide is the most important of the prime pigments and extension of these prime pigments with sodium silico aluminate materially reduces the pigments cost while providing equal or better pigment properties.

The prior art contemplates the extension of titanium dioxide pigments with other less expensive pigments such as silica, kaolin, and silicic acid, but in each of these the properties of the titanium dioxide are degraded rather than enhanced. The sodium silico aluminates of the present invention are prepared as described in U.S. Patents 2,739,037 and 2,848,346.

SUMMARY OF THE INVENTION

The invention relates to novel titanium dioxide-sodium silico aluminate pigment complexes and the method of producing such complexes during the formation of the titanium dioxide by the sulfate process. The primary object of the invention is to provide a titanium dioxide pigment complexed with a less expensive extender pigment, sodium silico aluminate, with pigment properties superior to a titanium dioxide pigment made with the same process without the extender pigment. The pigment is useful as a substitute for unextended titanium dioxide pigments and titanium dioxide pigments extended by other materials and by other methods. The products in which the pigments is used such as paper, paint, rubber, plastics sealants, and the like, are equal to or superior to these products when made with titanium dioxide pigments of the prior art.

DESCRIPTION OF THE PREFERRED EMBODIMENTS

Figure 1:
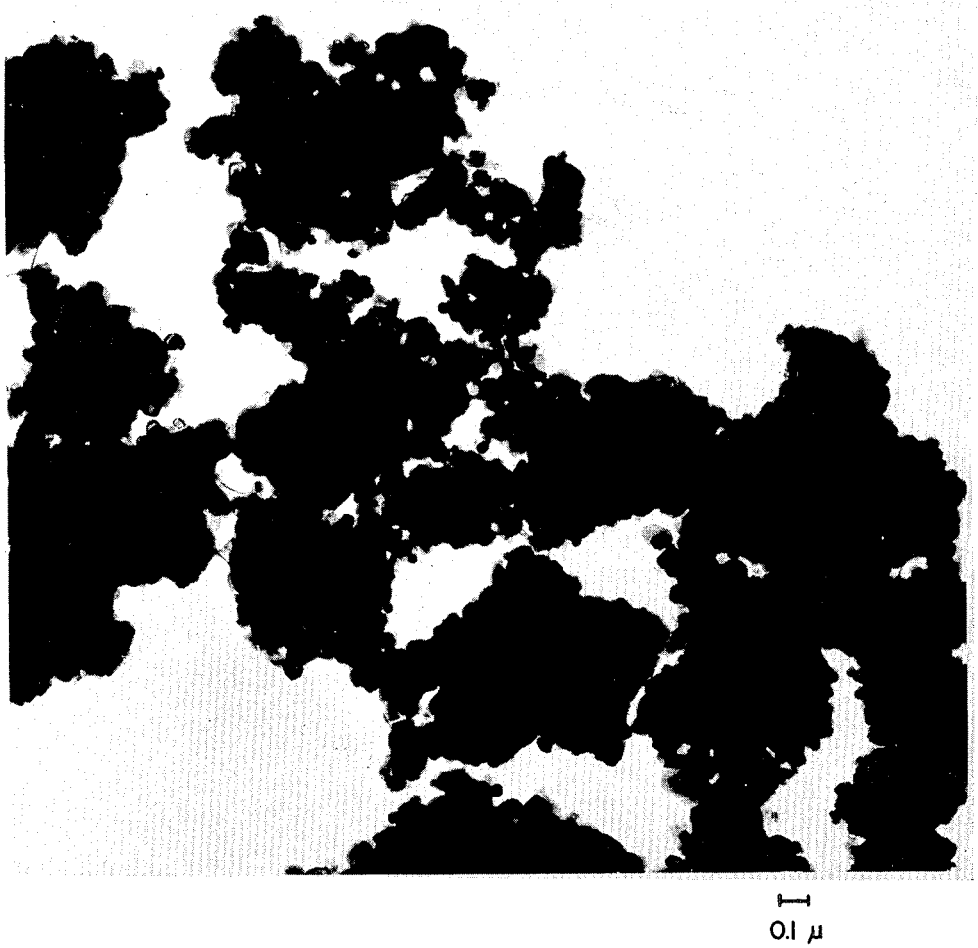
FIGURE 1 is a photomicrograph of the prior art titanium dioxide pigment produced in Example 1.

The present invention is directed to novel pigment complexes and methods for producing these complexes. More particularly, it refers to pigments complexes which consist primarily of a high strength, high hide, or good covering power pigment such as titanium dioxide coupled by means of surface effects and related bonding mechanisms with functional extenders known as the synthetic silicas and silicates.

The synthetic silicas and silicates have a unique combination of chemical and physical properties which make them useful in many industries. The properties of primary interest are particle size and shape, chemical nature of the surface, state of aggregation, aggregate packing and density, surface area, sorptivity, surface activity, and chemical composition. Because of these properties, these synthetic silicas and silicates find wide use in industry as an extender of prime pigments. Titanium dioxide is one of the most popular prime pigments and is used in many industrial and commercial applications such as in paint, paper, rubber, plastic, sealants and wherever good covering power and high degrees of whiteness are prerequisites to functional utility. The commercial titanium dioxide pigments are costly materials which exhibit poor dispersibility, unstable packing characteristics and pronounced flocculation and re-agglomeration tendencies.

In normal commercial applications, the synthetic silicas and silicates extend titanium dioxide by improviing and/or stabilizing the particle packing characteristics of the titanium dioxide. In effect, the synthetic silicas and silicates space the titanium dioxide particles preventing flocculation, aggregation, and agglomeration. This extender—$TiO_2$ spacing is in the order of 0.2 to 0.4 microns or about one-half the wave length of visible light. This provides nearly optimum light scattering and reflection and maximizes covering power and degree of whiteness achieved in the finished material containing the extender and $TiO_2$. In normal use the silicas and slicates and the titanium dioxide are received via separate shipments. The pigments are then co-slurried or co-blended and added as blends or added separately to the manufacturing process by the paper, paint, rubber, plastics, etc. producers. Many factors such as dispersing agents, pH adjustments, surface treatments, mixing intensities and solids concentrations affect the optical efficiency of the extender—$TiO_2$ pigment system. The current methods for using the silica and silicate extenders and titanium dioxide are such that optical utilization is only about 70% effective although the extender—$TiO_2$ combination is synergistic—that is it is more efficient than the $TiO_2$ alone. Similarly the current methods for using the extender—$TiO_2$ system still permits the formation of some large agglomerates and the pigment system can be shown by microscopy to be nothing more than an intimate mixture.

The pigment complexes of this invention overcome the aforementioned disadvantages of extended prime pigment systems wherein the materials are added and/or used separately in commerical practice. In addition, the introduction of the synthetic sodium silica aluminate into the $TiO_2$ process yield processing advantages which can provide major cost savings. Of particular significance in this respect, is that the complexed products of this invention exhibit excellent wetting and dispersive properties without the normal costly $TiO_2$ process post-calcination treatment of chemical addition, wet dispersion, wet classifying, wet grinding, and final filtering, washing, drying, and grinding.

The term Zeolex® used herein refers to a synthetic amorphous sodium silico aluminate manufactured by J.

M. Huber Corporation under the teaching of U.S. Patents 2,739,073 and 2,848,346.

The thermal hydrolysis or sulfate process is the one most adaptable to the introduction of Zeolex into the process.

The conventional sulfate process, used herein, involves the following operations:

(1) Digestion of the ore.
(2) Clarification of the solution.
(3) Hydrolysis to precipitate hydrous titanium oxide.
(4) Filtration and washing of the hydrous oxide.
(5) Calcination.
(6) Grinding.

The hydrolysis operation is extremely critical since the crystal form, particle size, yield, and purity are determined during the hydrolysis.

The instant invention has shown that Zeolex can be complexed with titanium dioxide by hydrolyzing the titanyl sulfate in blunge water containing Zeolex. X-ray diffraction studies indicated similar crystal structures for the standard and Zeolex-complexed titanium dioxides. Electron microscopy studies showed much better dispersion characteristics for the Zeolex-complexed titanium dioxide as compared to the standard titanium dioxide.

EXAMPLE I

As a control 400 cc. of titanium sulfate solution (black liquor) of composition 230 g.p.l. $TiO_2$, 65 g.p.l. Fe and 560 g.p.l. sulfate as $H_2SO_4$ was added to 100 cc. of $H_2O$ at the rate of 25 cc./min., the blunge water being held at 91° C. and the black liquor at 97° C. The temperature of the mixed liquors is then raised to 110° C. and refluxed for 3.7 hours. The slurry was then filtered. The filter cake was then reslurried for one hour in one liter of $H_2O$ with 5.0 cc. concentrated $H_2SO_4$ added. The slurry was refiltered, dried at 105° C. for 16 hours, and then calcined at 850° C. for two hours.

Yield after calcination was 79.0 grams. The material was very white and friable. It was then milled by one pass through a screen type hammer mill.

The electron micrograph of FIGURE 1 shows the material to consist of small, spherical particles, approximately .05 micron diameter, tightly agglomerated and fused into irregular shaped clumps as large as 1 micron nominal size. X-ray diffraction shows the material to be well crystallized, pure anatase $TiO_2$.

EXAMPLE II

Maintaining the same temperatures, addition rates and other variables as described in Example I, the following was done.

Zeolex®, a synthetic sodium silico aluminate, made according to the disclosure of U.S. Patents 2,739,073 and 2,848,346 by J. M. Huber Corporation, was preslurried in 80 cc. $H_2O$, then added to the 100 cc. of blunge water. Zeolex is added in such amount so that the dried product of the titania precipitation will result in an 80% $TiO_2$–20% Zeolex mixture.

The titania precipitation is carried out again by a 25 cc./min. addition of titanium sulfate solution to the blunge water containing the Zeolex.

The product was boiled, filtered, reslurried and filtered, dried, calcined and milled as in Example I. The filtration rate of this product was much faster than control Example I.

Figure 2:
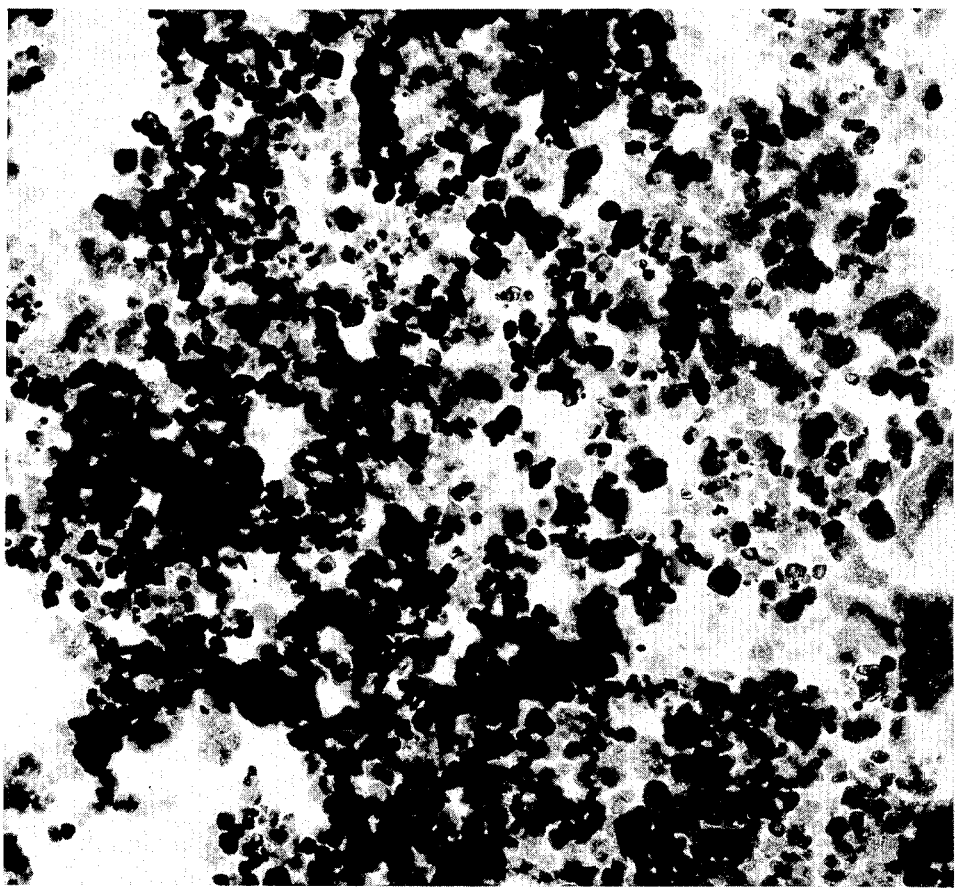
FIGURE 2 is a photomicrograph of the complexed pigment produced in Example 2.

The electron micrograph of the product as seen in FIGURE 2 shows a well dispersed system of Zeolex and $TiO_2$ particles. Agglomeration of the titania has been prevented, and in no instance can an aggregate larger than .1 micron be found.

X-ray diffraction shows only well crystallized anatase titania. Zeolex, being an amorphous material, makes no contribution to the diffraction tracing other than a small amorphous "hump."

EXAMPLE III

An aliquot of hydrous $TiO_2$ slurry from a commercial precipitation process was calcined at 850° C. for 3 hours. This product was admixed with calcined Zeolex in a weight ratio of 80% $TiO_2$–20% Zeolex. The two were blended in a Patterson-Kelly Blender and milled by one pass through a hammer mill.

Figure 3:
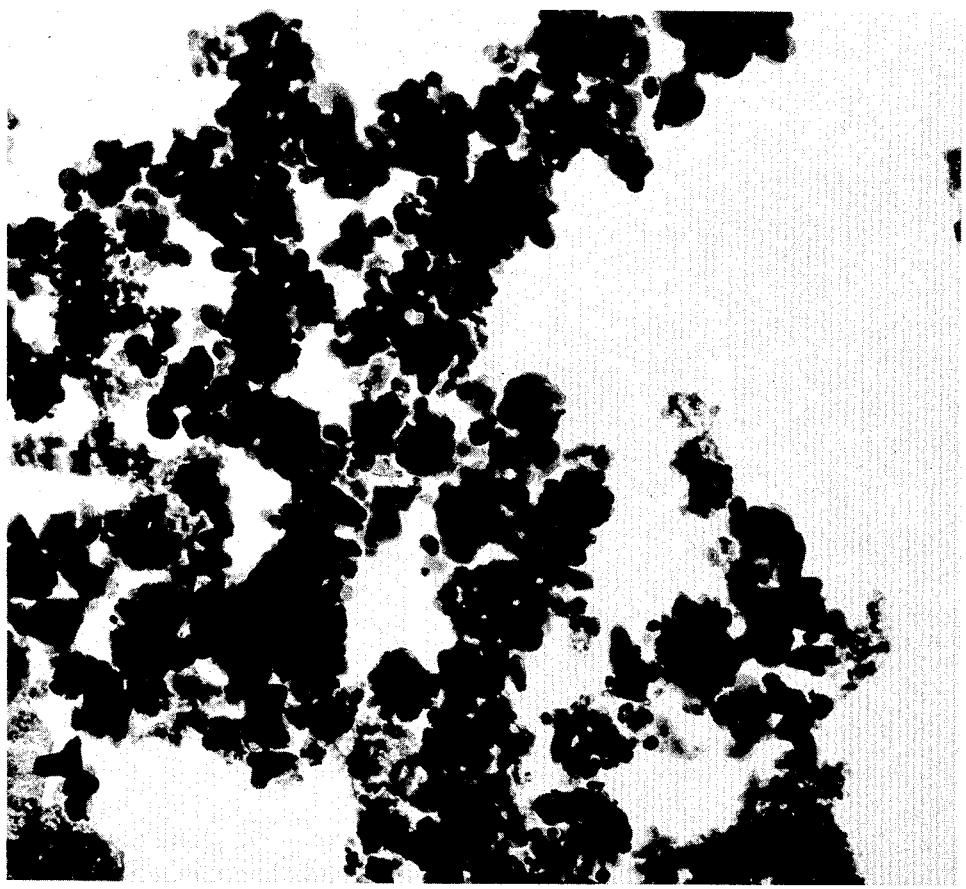
FIGURE 3 is a photomicrograph of the mixed pigment produced in Example 3.

A photomicrograph of the resulting product is shown in FIGURE 3. The titania again has a propensity to agglomerate into large bundles.

EXAMPLE IV

The procedure of Example III was repeated, the only change being the premixing of Zeolex into the hydrous titania before the calcining. The Zeolex-titania slurry was then calcined under identical conditions as in Example III.

Figure 4:
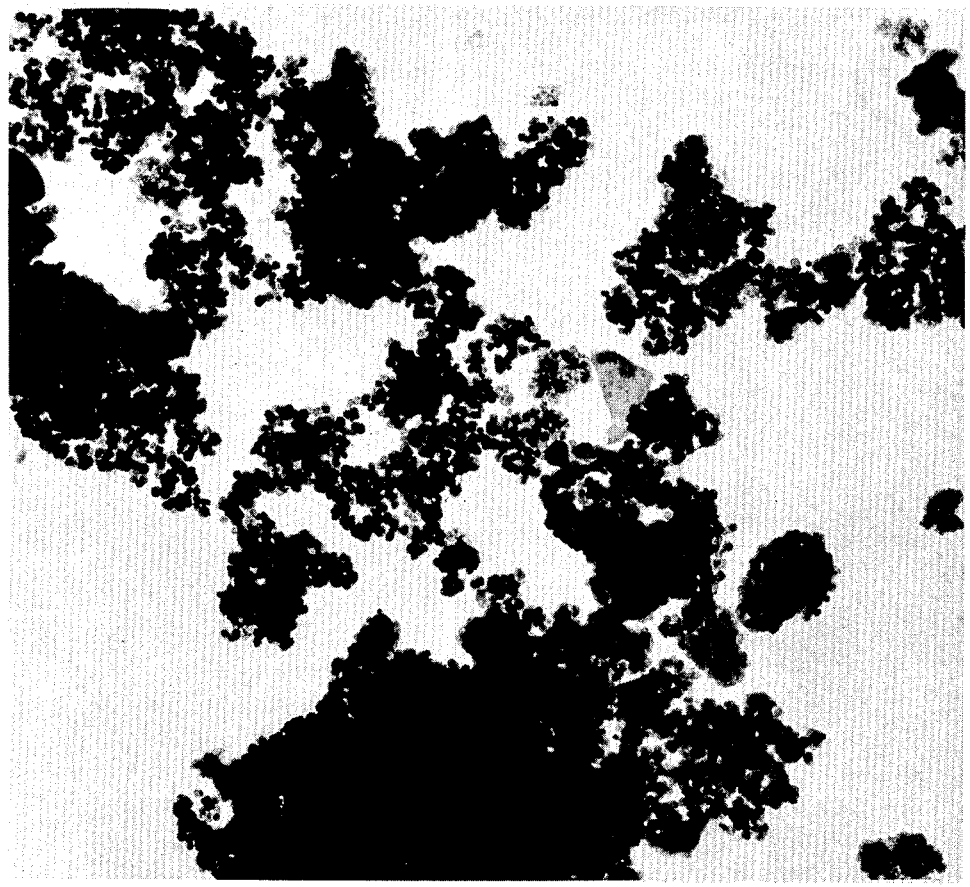
FIGURE 4 is a photomicrograph of the mixed pigment produced in Example 4.

An electron micrograph (FIGURE 4) again shows well dispersed, non-agglomerating particles about .05 micron diameter. X-ray diffraction shows the sample to contain mostly well crystallized anatase, with traces of poorly crystallized rutile.

EXAMPLE V

Control runs were made by calcining Zeolex by itself, and calcining the commercially prepared hydrous titania by itself. Both were calcined at 850° C. for two hours.

Figure 5:
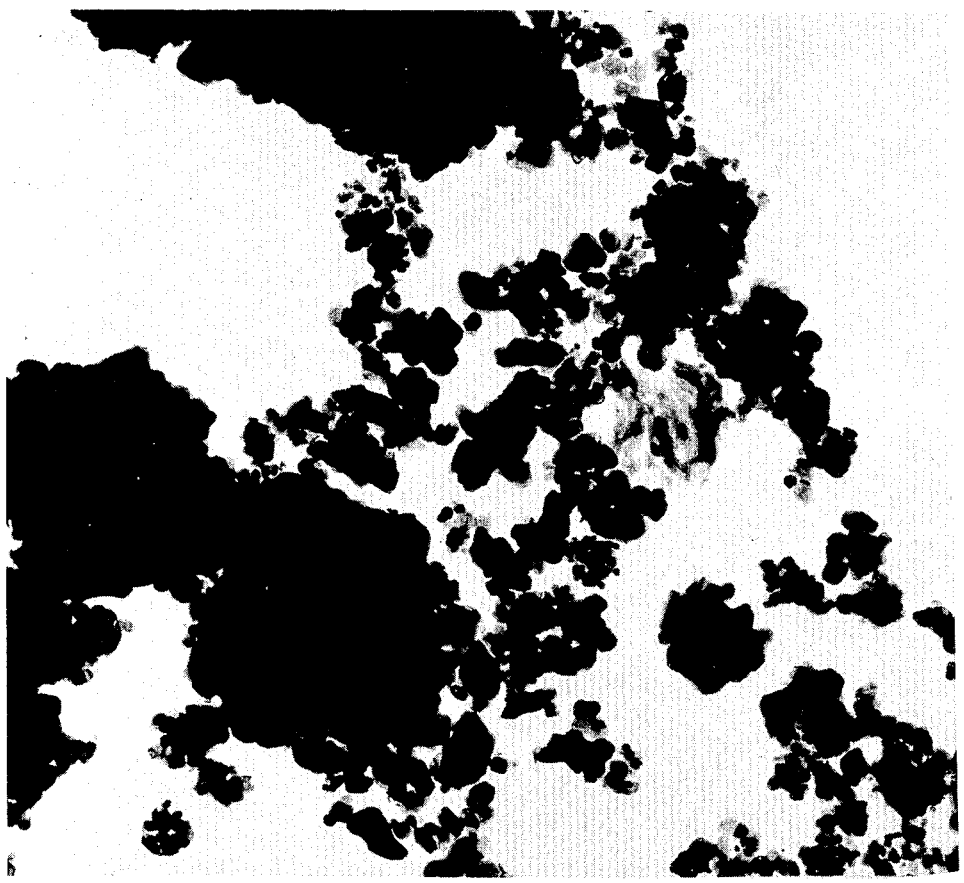
FIGURE 5 is a photomicrograph of titanium dioxide calcined without the sodium silico aluminate extender pigment; and,
FIGURE 6 is a photomicrograph of the sodium silico aluminate extender pigment calcined without the titanium dioxide.

FIGURE 5 shows the large particles of titania when calcined without the Zeolex present. This should be compared with FIGURE 3, where the titania has been prevented (by the presence of Zeolex) from growing into particles greater than .05 micron.

Figure 6:

FIGURE 6 shows the ultrafine particles of Zeolex when calcined alone.

What is claimed is:

1. The method of producing a titanium dioxide-synthetic amorphous sodium silico aluminate complexed pigment having an equivalent spherical diameter particle size not in excess of 0.1 micron and including about 80% titanium dioxide and about 20% synthetic amorphous sodium silico aluminate, comprising the steps of digesting ilmenite ore with sulfuric acid in solution, clarifying the solution by settling solids therefrom, hydrolyzing the solution by adding the solution to blunge water containing a synthetic amorphous solution silico aluminate producing a titanium dioxide—synthetic amorphous sodium silico aluminate complex, and recovering the complex.

2. The method of claim 1 in which the hydrolyzing blunge water is maintained at about 91° C. and the sulfate solution at about 97° C. with the combined solution raised to about 110° C. and refluxed for about 3.5 hours.

References Cited
UNITED STATES PATENTS

| 2,739,073 | 3/1956 | Bertorelli. | |
| 2,848,346 | 8/1958 | Bertorelli. | |
| 2,913,419 | 11/1959 | Alexander | 106—300 XR |
| 3,035,966 | 5/1962 | Siuta | 106—300 XR |
| 3,062,621 | 11/1962 | Nelson et al. | 106—300 XR |
| 3,385,718 | 5/1968 | Hafford et al. | 106—300 XR |
| 3,409,501 | 11/1968 | Siuta | 106—300 XR |
| 3,410,708 | 11/1968 | McGinnis | 106—300 |

TOBIAS E. LEVOW, Primary Examiner

H. M. S. SNEED, Assistant Examiner

U.S. Cl. X.R.

106—33, 288; 162—181; 260—37, 762

UNITED STATES PATENT OFFICE
CERTIFICATE OF CORRECTION

Patent No. 3,499,779          Dated   March 10, 1970

Inventor(s) Robert K. Mays and Philip Thomas Cioni

It is certified that error appears in the above-identified patent and that said Letters Patent are hereby corrected as shown below:

At column 2, line 61, substitute -- silico -- for "silica", so that the sentence in lines 60 through 63 reads, "In addition, the introduction of the synthetic sodium silico aluminate into the $TiO_2$ process yields processing advantages which can provide major cost savings."

In Claim 1, at column 4, line 48, substitute -- sodium -- for "solution", so that line 48 reads, " ... water containing a synthetic amorphous sodium silico ... ".

Signed and sealed this 14th day of September 1971.

(SEAL)
Attest:

EDWARD M. FLETCHER, JR.          ROBERT GOTTSCHALK
Attesting Officer                Acting Commissioner of Patents